(12) United States Patent
Wu

(10) Patent No.: US 9,047,270 B2
(45) Date of Patent: Jun. 2, 2015

(54) DMA-ASSISTED IRREGULAR SAMPLING SEQUENCES

(71) Applicant: Freescale Semiconductor, Inc., Austin, TX (US)

(72) Inventor: Chongli Wu, Queen Creek, AZ (US)

(73) Assignee: FREESCALE SEMICONDUCTOR INC., Austin, TX (US)

( * ) Notice: Subject to any disclaimer, the term of this patent is extended or adjusted under 35 U.S.C. 154(b) by 0 days.

(21) Appl. No.: 13/745,425

(22) Filed: Jan. 18, 2013

(65) Prior Publication Data

US 2014/0207979 A1     Jul. 24, 2014

(51) Int. Cl.
  *G06F 13/28*    (2006.01)
  *G06F 13/12*    (2006.01)
  *H03M 1/00*     (2006.01)

(52) U.S. Cl.
  CPC ...................................... *G06F 13/28* (2013.01)

(58) Field of Classification Search
  CPC ......... G06F 3/00; G06F 13/28; G06F 1/0321; G06F 17/5063
  USPC ........................................ 710/22, 28, 69, 70
  See application file for complete search history.

(56) References Cited

U.S. PATENT DOCUMENTS

| | | | |
|---|---|---|---|
| 4,456,871 A | 6/1984 | Stich | |
| 4,908,622 A | 3/1990 | Turai | |
| 5,166,685 A | 11/1992 | Campbell, Jr. et al. | |
| 6,486,809 B1 * | 11/2002 | Figoli | 341/141 |
| 6,701,395 B1 * | 3/2004 | Byrne et al. | 710/69 |
| 6,839,013 B1 | 1/2005 | Cummins et al. | |
| 7,135,680 B2 * | 11/2006 | Elkind et al. | 250/332 |
| 7,142,140 B2 | 11/2006 | Storvik et al. | |
| 7,376,778 B2 * | 5/2008 | Sinai | 710/312 |
| 7,809,902 B2 * | 10/2010 | Efland et al. | 711/157 |
| 7,916,053 B2 * | 3/2011 | Stanley et al. | 341/123 |
| 2006/0015551 A1 | 1/2006 | Ding | |
| 2012/0328696 A1 * | 12/2012 | Kim | 424/451 |
| 2014/0089536 A1 * | 3/2014 | Pedersen et al. | 710/22 |

\* cited by examiner

*Primary Examiner* — Idriss N Alrobaye
*Assistant Examiner* — Getente A Yimer
(74) *Attorney, Agent, or Firm* — Ingrassia Fisher & Lorenz, P.C.

(57) ABSTRACT

Methods and systems are provided for performing sampling sequences using a control module. One exemplary method involves transferring sampling configuration information for a sampling sequence from memory to a conversion module. The conversion module performs the sequence in accordance with the configuration information by performing sampling processes at a plurality of sampling times to obtain a plurality of samples, and transferring results corresponding to the plurality of samples from the conversion module to the memory. At least some sampling times of the plurality of sampling times are nonperiodic with respect to the other sampling times of the plurality of sampling times. In exemplary embodiments, the sampling configuration information includes a sampling mode criterion, and the conversion module either automatically performs a sampling process or performs the sampling process in response to a trigger signal based on the sampling mode criterion for that sampling process.

17 Claims, 6 Drawing Sheets

| Sample # | Input to Sample | Sample Time | Sampling Mode | Interrupt Enable |
|---|---|---|---|---|
| 1 | $IN_1$ | $T_1$ | 1 | 0 |
| 2 | $IN_2$ | $T_2$ | 1 | 0 |
| 3 | $IN_2$ | $T_2+\Delta$ | 0 | 0 |
| 4 | $IN_3$ | $T_3$ | 1 | 0 |
| 5 | $IN_3$ | $T_3+\Delta$ | 0 | 1 |

DMA-ASSISTED IRREGULAR SAMPLING SEQUENCES

TECHNICAL FIELD

Embodiments of the subject matter described herein relate generally to electrical systems that perform analog-to-digital (or digital-to-analog) conversions, and more particularly, embodiments of the subject matter relate to conversion modules configurable for nonperiodic sampling sequences in conjunction with direct memory accesses.

BACKGROUND

As described in U.S. Pat. No. 7,916,053, it is often desirable to measure or obtain sampled values for electrical signals within a pulse-width modulation (PWM) interval to better control operation of an electrical system (e.g., in a closed-loop control system). When the PWM signals are dynamically determined, the particular times when it is desirable to measure the electrical signals may vary for each PWM interval. However, many prior art systems fail to support dynamically configuring the sampling sequence for sampling in an irregular and/or dynamic manner that varies by PWM interval without a relatively high number of interrupts and software overhead, which limits the sampling capabilities as the frequency of the PWM signals increases.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures, which are not necessarily drawn to scale.

DETAILED DESCRIPTION

Figure 1:
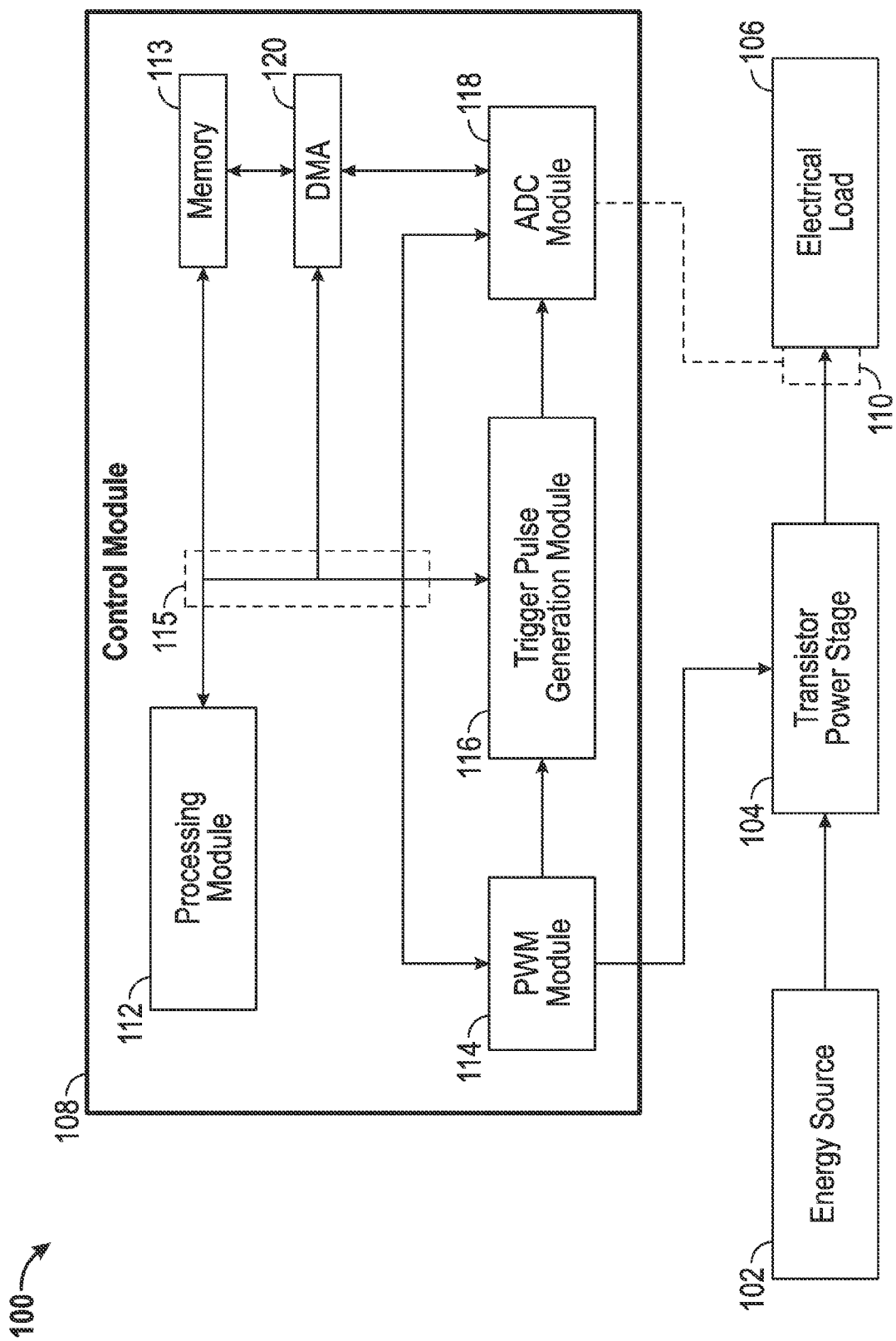
FIG. 1 is a block diagram of an electrical system in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Embodiments of the subject matter described herein relate to performing conversions or sampling processes in accordance with a sampling sequence that includes plurality of samples scheduled in a nonperiodic or irregular manner, that is, the sampling time associated with each sample of the sampling sequence may be independent of the sampling time associated with the other samples of the sampling sequence. In this regard, the time period between a first sample and a second sample immediately following the first sample is independent of, and may be different from, the time period between the second sample and a third sample immediately following the second sample. The individual samples of the sampling sequence may be precisely scheduled, either relative to a preceding sample or a hardware trigger event. The configuration information for performing the sampling process is written to or otherwise stored in memory prior to a modulation cycle (or interval), so that the sampling sequence may be completely performed without interrupts or other software overhead during execution of the sampling sequence.

As described in greater detail below, a direct memory access (DMA) module sequentially transfers sampling configuration information for the individual samples of the sampling sequence from the memory to the conversion module. The sampling configuration information for an individual sample may include, for example, values specifying an input channel to be selected for sampling, a desired gain factor for the sample, a sampling mode criterion for obtaining the sample, an indication of whether an interrupt signal should be generated after the sample (e.g., an interrupt criterion). The conversion module automatically configures itself for each individual sample and based on the sampling mode criterion (e.g., either to automatically obtain the sample, or alternatively, to wait to receive a trigger signal or some other indication before obtaining the sample). After the conversion module performs the sampling process, the conversion module provides a notification or indication to the DMA module, and the DMA module transfers the result of the sampling process (e.g., a "sample", represented by a digital value quantifying a voltage level or magnitude of an analog signal being sampled) from the conversion module to a location (or address) in the memory corresponding to that sample. The DMA module then transfers sampling configuration information for the next sample of the sampling sequence from the memory to the conversion module. In this regard, based on the sampling mode criterion included in the configuration information for a respective sample, the conversion module either automatically performs the sampling process or delays performing the sampling process, thereby allowing the times between successive sampling processes to be nonperiodic with respect to one another such that the differences between successive sampling times may vary across the sampling sequence. It should be noted that although the subject matter may be described herein in the context of analog-to-digital conversions for purposes of explanation, in practice, the subject matter described herein may be implemented in an equivalent manner for digital-to-analog conversions, and thus, the subject matter described herein is not limited to analog-to-digital conversion or digital-to-analog conversion.

Turning now to FIG. 1, an exemplary electrical system 100 includes, without limitation, an energy source 102, a transistor power stage 104, an electrical load 106, and a control module 108. In exemplary embodiments, the energy source 102 is coupled to the transistor power stage 104, which in turn, is coupled to the electrical load 106. The control module 108 is coupled to the transistor power stage 104 and the electrical load 106, and the elements of the electrical system 100 are suitably configured to provide electrical power from the energy source 102 to the electrical load 106 using pulse-width modulation (PWM) by operating the transistor power stage 104 under control of the control module 108, as described in greater detail below. It should be understood that FIG. 1 is a simplified diagram of the electrical system 100 for purposes of explanation, and FIG. 1 is not intended to limit the scope of the subject matter in any way.

Depending on the embodiment, the energy source 102 may be realized as an alternating current (AC) energy source or a direct current (DC) energy source. For example, depending on the embodiment, the energy source 102 may be realized as a battery, a fuel cell, a mains electrical supply, or another suitable energy source known in the art. Similarly, depending on the embodiment, the electrical load 106 may be realized as an AC electrical load or a DC electrical load. The electrical load 106 may be realized as any suitable electrical load, such as, for example, a motor or another suitable electrical component.

In an exemplary embodiment, the transistor power stage 104 is configured to regulate the voltage level (or input current level) provided by the energy source 102 to the input 110 of the electrical load 106. In this regard, the transistor power stage 104 comprises one or more transistors (or switches) configured such that modulating (e.g., turning on or off) the one or more transistors produces a corresponding change in the voltage level at (or input current to) the electrical load 106, wherein the voltage level at (or input current to) the electrical load 106 is directly proportional to the duty cycle (e.g., the percentage or proportion of time which one or more of the transistors of the transistor power stage 104 is in the "on" or saturated state). In this regard, the control module 108 determines PWM signals for modulating the transistor power stage 104 in order to produce a regulated signal level at the input 110 of the electrical load 106. The transistor power stage 104 may be realized as a switching circuit as part of a switched-mode power supply, such as, for example, a rectifier, an inverter, a converter, and the like. For example, in accordance with one embodiment, the energy source 102 is a DC energy source (e.g., a battery, the output of an AC-DC converter, or the output of a DC-DC converter) and the electrical load 106 is a DC load (e.g., the internal components of a computer), wherein the transistor power stage 104 is configured as a voltage converter having a plurality of transistor switches configured such that modulating the transistor switches produces an effective DC voltage level suitable for the electrical load 106 at the input 110 to the electrical load 106. In this embodiment, the transistor power stage 104 provides a voltage regulated output which is coupled to the input 110 of the electrical load 106. It should be appreciated that in practice, the transistor power stage 104 may operate in conjunction with and/or include suitably configured electrical energy storage devices, such as capacitors and/or inductors, diodes, and other suitably configured electrical circuitry.

The control module 108 generally represents the hardware, firmware and/or software components of the electrical system 100 that are configured to control or otherwise regulate the voltage at the input 110 of the electrical load 106 and perform additional tasks and/or functions described in greater detail below. In practice, the control module 108 may be realized as a system-on-a-chip, such as, for example, a digital signal controller (DSC) or another suitable controller (or microcontroller). In an exemplary embodiment, the control module 108 includes a processing module 112, a data storage element (or memory) 113, a PWM module 114, a trigger pulse generation module 116, an analog-to-digital conversion (ADC) module 118, and a DMA module 120. In practice, the control module 108 may also include additional peripheral modules suitably configured to support operation of the electrical system 100. As illustrated in FIG. 1, in exemplary embodiments, the processing module 112 is communicatively coupled to the memory 113, the PWM module 114, the trigger pulse generation module 116, the ADC module 118, and the DMA module 120 over a parallel bus interface 115, although in practice, another suitably configured bus, shared interface, or another interconnection arrangement may be used. In accordance with one embodiment, the processing module 112 and the peripheral modules 114, 116, 118, 120 each receive a clocking signal having a clock frequency ($f_{CLK}$) such that the components of the control module 108 operate in a synchronous manner, as will be appreciated in the art. The PWM module 114 is also coupled to the trigger pulse generation module 116, which in turn is coupled to the ADC module 118 to provide signals that trigger or otherwise initiate sampling by the ADC module 118, as described in greater detail below. In some alternative embodiments, the PWM module 114 may communicate with the trigger pulse generation module 116 over the bus interface 115, and likewise, the trigger pulse generation module 116 may be communicatively coupled to the ADC module 118 over the bus interface 115.

Depending on the embodiment, the processing module 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processing module 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processing module 112 includes processing logic that may be configured to carry out the functions, techniques, and processing tasks associated with the operation of the control module 108. In this regard, the steps of a method or algorithm described in connection with the embodiments disclosed herein may be embodied directly in hardware, in firmware, in a software module executed by the processing module 112 and/or DMA module 120, or in any practical combination thereof. In this regard, the control module 108 includes a data storage element (or memory) 113 that may be accessed or otherwise utilized by the processing module 112 and/or DMA module 120 to support the operations of the control module 108, as described below. The memory 113 generally represents any non-transitory short or long term storage media or other computer-readable medium capable of storing programming instructions for execution by the processing module 112 that, when read and executed by the processing module 112, cause the processing module 112 to perform the tasks, operations, functions, and processes described in more detail below. The memory 113 may be realized as any sort of random access memory (RAM), read only memory (ROM), flash memory, registers, a hard disk, a removable disk, or any other form of storage medium known in the art or any suitable combination thereof. It should be noted that although the memory 113 and the processing module 112 are shown as separate elements, in practice, the memory 113 may be integral with the processing module 112, as will be appreciated in the art.

As described in greater detail below in the context of FIG. 4, in exemplary embodiments, the processing module 112 determines PWM parameters for operating the transistor power stage 104 during an upcoming PWM cycle and a corresponding sampling sequence based on those PWM parameters. As used herein, a PWM cycle should be understood as referring to a time period having a duration equal to the period of the modulation waveform (e.g., a triangle waveform, a sawtooth waveform, or another suitable waveform) used to generate and/or determine the duty cycles for the PWM signals. For example, if the modulation waveform is a triangle wave, the length or duration of the PWM cycle is equal to the period of the triangle waveform, i.e., from trough to trough or peak to peak. In other words, the duration of the PWM cycle is equal to the inverse of the frequency of the modulation waveform used to generate the PWM signals. For switched-mode power supplies, the frequency of the modulation waveform may range from about 100 kHz to 500 kHz or more. In an exemplary embodiment, the processing module 112 determines the set of PWM parameters for the upcoming PWM cycle by comparing the measured voltage level(s) at the input 110 of the electrical load 106 from the previous PWM cycle to a desired output voltage level. The processing module 112 provides the set of PWM parameters to the PWM module 114, which in turn generates the desired PWM signals for operating the transistor power stage 104 to produce the desired output voltage level.

The "sampling sequence" determined by the processing module 112 identifies a plurality of samples and a sampling schedule. The samples of the sampling sequence are arranged in a particular order based on the PWM parameters (or the expected PWM signals) for the upcoming PWM cycle. The sampling schedule dictates the timing for each sample of the sampling sequence. The processing module 112 determines sampling configuration information for each sample of the sampling sequence, such as, for example, the desired timing for each respective sample relative to the preceding sample of the sampling sequence and the desired input signal to the ADC module 118 that is to be sampled based on the PWM parameters. For example, as mentioned above, and as will be described in greater detail below in the context of FIG. 3, the sampling configuration information for each sample may include a value (e.g., one or more bits) that indicates the desired input to the ADC module 118 to be sampled, a value (e.g., one or more bits) that indicates a desired gain for that respective sample, an indicator (e.g., a bit) of whether an interrupt should be generated after that respective sample, and an indicator (e.g., one or more bits) of a desired sampling mode (referred to herein as a "sampling mode criterion") for that respective sample of the sampling sequence. In an embodiment, the sampling mode criterion may indicate a first ("automatic") sampling mode or a second ("triggered") sampling mode. In this regard, when the sampling mode criterion specifies the automatic sampling mode, the sample is obtained immediately following the preceding sample of the sampling sequence (e.g., by automatically performing an analog-to-digital conversion after a preceding sample at the next possible sampling time), and when the sampling mode criterion specifies the triggered sampling mode, the sampling process is delayed and the sample is obtained at a particular time indicated by a hardware trigger signal. The processing module 112 writes or otherwise stores the sampling configuration information for all of the samples of the sampling sequence to a particular block of addresses in the memory 113, and the DMA module 120 is configured to successively transfer sampling configuration information from those respective addresses in memory 113 to the ADC module 118, as described in greater detail below.

Still referring to FIG. 1, the DMA module 120 generally represents the hardware, firmware and/or software components of the control module 108 that are coupled between the memory 113 and the ADC module 118 and configured to facilitate transferring the sample configuration information from the memory 113 to the ADC module 118 for each sample of the sampling sequence and transfer the corresponding sample result (e.g., the digital value or bits quantifying the voltage level of an analog signal being sampled) from the ADC module 118 back to the memory 113 for subsequent access by the processing module 112. As described in greater detail below in the context of FIG. 3, the DMA module 120 transfers the sampling configuration information (which may be written to the memory 113 by the processing module 112) for the initial sample of a sampling sequence from the memory 113 to the ADC module 118. Thereafter, the DMA module 120 receives an indication that the sampling process has been performed by the ADC module 118, at which point the DMA module 120 transfers the result of the initial sample from the ADC module 118 to an address (or location) in the memory 113 corresponding to the initial sample and then transfers the sample configuration information for the next sample of the sampling sequence from the memory 113 to the ADC module 118. The DMA module 120 continues repeatedly transferring sampling configuration information to and sample results from the ADC module 118 during the PWM cycle throughout operation of the control module 108. It should be noted that although the subject matter is described herein in the context of the DMA module 120 transferring the sampling configuration information and sample results from/ to the memory 113, in alternative embodiments, the functionality and/or features of the DMA module 120 may be integrated into or otherwise implemented by the processing module 112, and in such embodiments, the processing module 112 may independently transfer the sampling configuration information and sample results from/to the memory 113. To put it another way, the subject matter described herein is not necessarily limited to use with a DMA module that is separate from the processing module 112.

In the illustrated embodiment of FIG. 1, the PWM module 114 generally represents the hardware, software, and/or firmware components configured to generate PWM signals that modulate conductive states of the transistors of the transistor power stage 104 based on a set of PWM parameters determined and/or provided by the processing module 112, as described in greater detail below. The trigger pulse generation module 116 generally represents the hardware components configured to generate timing trigger signals for the ADC module 118, as described in greater detail below in the context of FIG. 2. In an exemplary embodiment, a timing trigger signal is a signal pulse which causes the ADC module 118 to perform an analog-to-digital conversion in response to the timing trigger signal in accordance with the configuration information for that sample, where the configuration information has been previously transferred to the ADC module 118 by the DMA module 120.

Still referring to FIG. 1, the ADC module 118 generally represents the hardware components coupled to the input 110 of the electrical load 106, and the hardware components are configured to obtain and/or sample the analog voltage level at the input 110 of the electrical load 106 to obtain a digital representation of the analog voltage level (or magnitude) at a particular instant in time. In this regard, the ADC module 118 and/or control module 108 may be coupled to the input 110 of the electrical load 106 via one or more analog sensors (e.g., voltage and/or current sensors). In an exemplary embodiment, the ADC module 118 samples and/or performs analog-to-digital conversions at particular sampling times, either automatically based on sampling configuration information maintained by the ADC module 118 or in response to a timing trigger signal provided by the trigger pulse generation module 116, as described in greater detail below in the context of FIG. 3. As used herein, "automatically performing a sampling process," "automatically converting," "automatically sampling," "automatically obtaining a sample," "automatically generating a sample," "automatically generating a sampling trigger signal," and variations thereof should be understood as referring to sampling an analog signal at a sampling time that depends, at least in part, on the sampling time of the immediately preceding sample. Depending on the embodiment, the sampling time of the automatically obtained sample may occur at the next possible sampling time after the previous sampling time (e.g., the sampling time of an immediately preceding sample) or at some other interval after the previous sampling time. For example, if a first sample is obtained at a first sampling time ($T_1$) in response to a timing trigger signal, a second sample automatically obtained after the first sample is obtained at a second sampling time ($T_1+\Delta$), where $\Delta$ represents a time difference between successive samples. For example, the time difference may correspond to an amount of time that is required for transferring the sampling configuration information for the second sample to the ADC module 118 from the memory 113 and for configuring the ADC module 118 in accordance with the sampling configuration information for the second sample after the ADC module 118 has obtained the result of the first sample.

Figure 2:
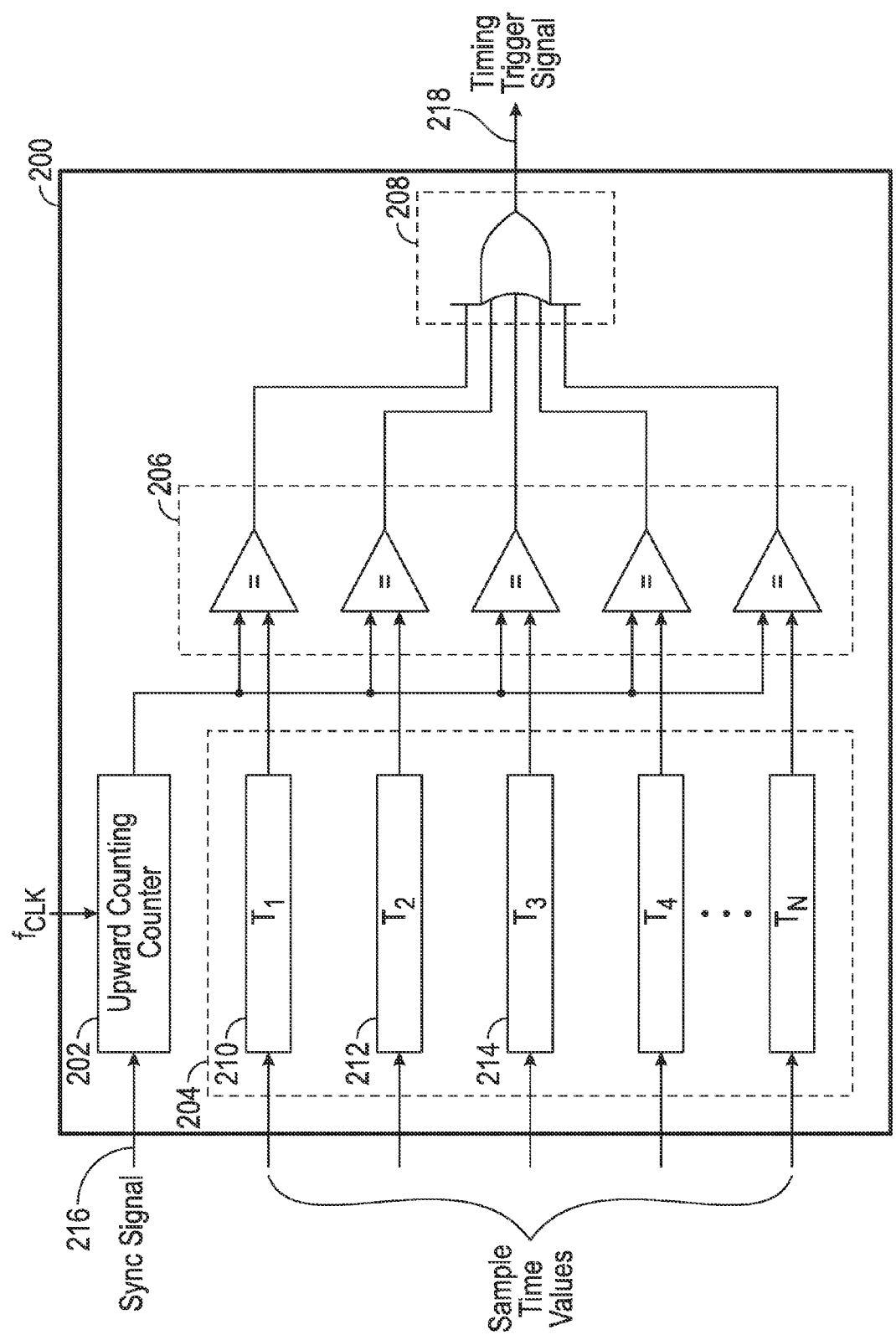
FIG. 2 is a block diagram of a trigger pulse generation module suitable for use in the electrical system of FIG. 1 in accordance with one embodiment of the invention.

FIG. 2 depicts an exemplary embodiment of a trigger pulse generation module 200 suitable for use as a trigger pulse generation module 116 in the electrical system 100 of FIG. 1. In an exemplary embodiment, the trigger pulse generation module 200 includes, without limitation, a counter 202, a plurality of registers 204, a plurality of digital comparators 206, and a logical OR gate 208. It should be noted that although FIG. 2 depicts the registers 204 within the trigger pulse generation module 200, in practice, the registers 204 may be implemented as part of memory 113 and communicatively coupled to the trigger pulse generation module 200. As described in greater detail below, in an exemplary embodiment, the trigger pulse generation module 200 is configured to provide one or more timing trigger signals 218 to an ADC module (e.g., ADC module 118) based on the value of the counter 202 and the values stored in the plurality of registers 204. In this regard, the trigger pulse generation module 200 includes N number of registers 204 and N number of comparators 206 (e.g., where N may be any integer number greater than two) suitably configured to support operation of the trigger pulse generation module 200, as described in greater detail below. It should be appreciated that FIG. 2 is a simplified diagram of the trigger pulse generation module 200 for purposes of explanation, and FIG. 2 is not intended to limit the scope of the subject matter in any way. In this regard, the trigger pulse generation module 200 may be configured for any number of timing trigger signals, and practical embodiments may include additional components suitably configured to support operation of the trigger pulse generation module 200.

The counter 202 is preferably configured as synchronous upward counting counter which initializes and/or resets to a zero value in response to a sync signal 216. In an exemplary embodiment, the sync signal 216 is generated by the PWM module 114 (FIG. 1). In this regard, the sync signal 216 should be understood as referring to a pulse signal from the PWM module 114 that corresponds to the PWM module 114 beginning a new PWM cycle, as described in greater detail below. In an exemplary embodiment, the registers 204 are coupled to the processing module 112 and configured to store digital values (e.g., sample time values) that correspond to particular sampling times (or timing references) after the sync signal 216 is received from the PWM module 114 such that the trigger pulse generation module 200 generates timing trigger signals 218 at those particular times after the sync signal 216. The value stored in each respective register 204 is a value equal to the value of a desired time (e.g., $T_N$) for a respective timing trigger signal multiplied by the interval of the clocking frequency of the counter 202 (e.g., $1/f_{CLK}$). As shown in FIG. 2, each register 204 is coupled to the input of digital comparator 206, and each digital comparator 206 has another input coupled to the counter 202 and configured to receive the current value (or count) of the counter 202. In an exemplary embodiment, the digital comparators 206 are configured such that the output of a respective comparator 206 is a logical '1' when the value of the counter 202 is equal to the value stored in the register 204 associated with the respective comparator 206, and otherwise, the output of the respective comparator 206 is a logical '0'. The logical OR gate 208 comprises N number of inputs, wherein each input is coupled to an output of a respective comparator 206, and the output of the logical OR gate 208 is preferably coupled to the ADC module 118, as described in greater detail below. In this manner, when the output of any of the digital comparators 206 is a logical '1', the output of the logical OR gate 208 changes to a logical '1' and thereby generates a timing trigger signal 218. In this manner, the trigger pulse generation module 200 generates any number of timing trigger signals 218 for the ADC module 118, wherein each timing trigger signal is generated at a particular time after the sync signal 216 from the PWM module 114.

Figure 3:
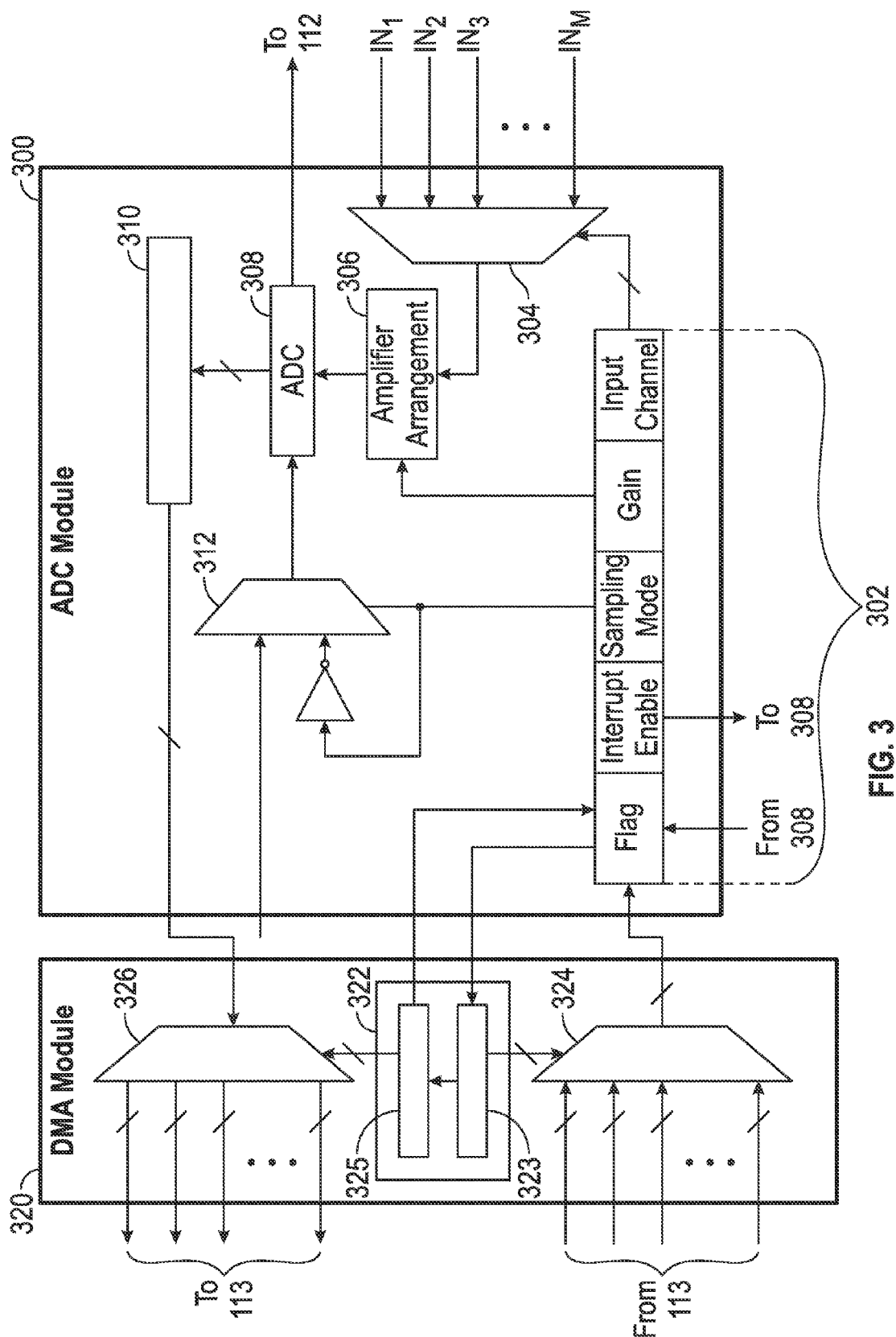
FIG. 3 is a block diagram of an analog-to-digital conversion module and a direct memory access module suitable for use in the electrical system of FIG. 1 in accordance with one embodiment of the invention.

FIG. 3 depicts an exemplary embodiment of an ADC module 300 suitable for use as the ADC module 118 in the electrical system 100 of FIG. 1 and a DMA module 320 suitable for use with the ADC module 300 as the DMA module 120 in the electrical system 100 of FIG. 1. The ADC module 300 includes, without limitation, a sample configuration register 302, an analog input channel selection multiplexer 304, an amplifier arrangement 306, an analog-to-digital converter 308, a conversion result register 310, and a sampling mode multiplexer 312. The sample configuration register 302 is coupled to the DMA module 320 to receive sample configuration information for an individual sample. The sample configuration information is transferred to the ADC module 300 from the memory 113 by the DMA module 320. In the illustrated embodiment, the sample configuration register 302 maintains one or more bits indicating the input channel to be selected (e.g., the input 110 to the electrical load 106) by the input channel selection multiplexer 304 for sampling, one or more bits indicating a desired gain for the amplifier arrangement 306 for the sample, one or more bits indicating a desired sampling mode for the sample (the sampling mode criterion), one or more bits indicating whether an interrupt signal should be generated after the sample, and a flag bit indicating whether the sample has been completed. The input channel selection bits of the configuration register 302 are coupled to or otherwise provided to the selection input of the input channel selection multiplexer 304 to select which input of the plurality of analog inputs (e.g., $IN_1$ through $IN_M$) to the input channel selection multiplexer 304 is provided to the ADC 308 for sampling. The gain control bits of the configuration register 302 are coupled to the amplifier arrangement 306 to control the amount of gain provided to the analog input signal selected by the input channel selection multiplexer 304 before providing the amplified analog input signal to the analog input of the ADC 308.

In exemplary embodiments, the ADC 308 converts the analog signal level from the output of the amplifier arrangement 306 into a corresponding digital value in response to a sampling trigger signal (or alternatively, an ADC triggering signal) provided at the output of the sampling mode multiplexer 312. The ADC 308 may be realized using any suitable analog-to-digital converter type (e.g., flash ADC, sigma-delta ADC, Nyquist rate cyclic ADC, or the like) that is capable of performing analog-to-digital conversions in response to a sampling trigger signal from the sampling mode multiplexer 312. In exemplary embodiments, the ADC 308 converts the analog signal level at its analog input to a multi-bit digital value at its digital output, however, in other embodiments, the ADC 308 may convert the analog signal to a single-bit digital value as will be appreciated in the art. The digital output of the ADC 308 is coupled to the result register 310 which stores or otherwise maintains the digital value corresponding to the analog signal level at the analog input of the ADC 308 when the ADC triggering signal occurred. In exemplary embodiments, the ADC 308 is coupled to the flag bit of the configuration register 302 to set the flag bit to a value (e.g., logical '1') indicating that the sample has been completed after performing a conversion (i.e., performing a sampling process or obtaining a sample). Additionally, the ADC 308 is coupled to the interrupt enable bit of the configuration register 302 to identify whether an interrupt signal should be generated after performing the conversion. For example, when the interrupt enable bit is a logical '1', the ADC 308 may generate or otherwise provide an interrupt signal to the processing module 112 (e.g., via bus interface 115) after performing a conversion, thereby indicating to the processing module 112 that the result for that sample of the sampling sequence (and also, the results of any preceding samples of the sampling sequence) is available.

As illustrated in FIG. 3, the sampling mode control bit of the configuration register 302 is coupled or otherwise provided to the selection input of the sampling mode multiplexer 312 to control whether the ADC 308 is automatically triggered when the sample configuration information is transferred to the ADC module 300 or the ADC 308 is to wait for an external triggering signal (e.g., from trigger pulse generation module 116) before performing a conversion. For example, a first input of the sampling mode multiplexer 312 may be coupled to the output of the trigger pulse generation module 116, the processing module 112, or another component of the electrical system 100 capable of generating a trigger signal at a desired sampling time, while a second input of the sampling mode multiplexer 312 is coupled to the sampling mode control bit of the configuration register 302. In the illustrated embodiment, the sampling mode control bit is inverted before being provided to the second input of the sampling mode multiplexer 312, and the sampling mode multiplexer 312 is configured so that the output of the trigger pulse generation module 116 is provided to the triggering input of the ADC 308 when the sampling mode control bit is a logical '1,' and the inverted sampling mode control bit is provided to the triggering input of the ADC 308 when the sampling mode control bit is a logical '0'. Thus, when the sampling mode control bit of the sampling configuration information for a sample is set to a logical '0' (e.g., the sampling mode criterion specifies the automatic sampling mode, rather than the triggered sampling mode), the ADC 308 is automatically triggered via the sampling mode multiplexer 312 after the sampling configuration information is transferred to the configuration register 302. In this manner, the ADC 308 may automatically convert (or sample) the selected analog signal based on the sampling configuration information for a sample and store the resulting digital value in the result register 310.

Still referring to FIG. 3, in exemplary embodiments, the DMA module 320 includes, without limitation, a DMA control module 322, a sample configuration selection multiplexer 324 and a sample result selection demultiplexer 326. The inputs of the sample configuration selection multiplexer 324 are coupled to the locations (or addresses) in memory 113 corresponding to the block of memory 113 where the sampling configuration information for the samples of a sampling sequence are maintained. In this regard, each input of the sample configuration selection multiplexer 324 corresponds to the bits of sampling configuration information for an individual sample of the sampling sequence. The output of the sample configuration selection multiplexer 324 is coupled to the configuration register 302 of the ADC module 300 so that the sampling configuration information for the sample selected by the sample configuration selection multiplexer 324 is provided to the configuration register 302. In this regard, the number of bits of sampling configuration information for an individual sample may be less than the number of bits supported by the configuration register 302, so that the flag bit in the configuration register 302 is not written or otherwise modified by the transfer of sampling configuration information and is only set by the ADC module 300 or the DMA control module 322, as described in greater detail below. The outputs of the sample result selection demultiplexer 326 are coupled to the locations (or addresses) in memory 113 corresponding to the block of memory 113 where the results of the samples of the sampling sequence are to be written, stored, or otherwise maintained. In this regard, each output of the sample result selection demultiplexer 326 corresponds to a location (or address) in memory where the bits of a digital value resulting from an individual sample of the sampling sequence will be stored. The input of the sample result selection demultiplexer 326 is coupled to the result register 310 of the ADC module 300 so that the digital result value stored in the result register 310 for the sample selected by the sample result selection demultiplexer 326 is provided to the appropriate location in the memory 113.

In exemplary embodiments, the DMA module 320 includes a first transfer module 323 that controls the transfer of sampling configuration information from the memory 113 to the configuration register 302 and a second transfer module 325 that controls the transfer of sample results from the result register 310 to the memory 113. Each of the transfer modules 323, 325 may be realized as a state machine, a counter, or another suitable module capable of incrementing its associated multiplexer 324 or demultiplexer 326 through the memory locations corresponding to a sampling sequence. In exemplary embodiments, the configuration information transfer module 323 begins in an initial state at the beginning of a PWM cycle, and in the initial state, the configuration information transfer module 323 operates the sample configuration selection multiplexer 324 to provide the sampling configuration information for an initial sample of a sampling sequence from the memory 113 to the configuration register 302. Thereafter, the ADC module 300 performs the sample in accordance with the sampling configuration information maintained in the configuration register 302 either immediately (e.g., an automatic conversion) or in response to a subsequent trigger signal from the trigger pulse generation module 116 and then sets the flag bit of the configuration register 302 to a logical '1'. The configuration information transfer module 323 is coupled to the flag bit of the configuration register 302, and in response to the indication that the sampling process has been completed, the configuration information transfer module 323 signals or otherwise provides, to the result transfer module 325, an indication that the sample result in the result register 310 is ready to be written to the memory 113. In response, the result transfer module 325 operates the sample result selection demultiplexer 326 to provide the sample result for the initial sample of the sampling sequence from the result register 310 to the address (or location) in memory 113 corresponding to the initial sample of the sampling sequence. The result transfer module 325 is coupled to the flag bit of the configuration register 302, and after transferring the sample result to the memory 113, the result transfer module 325 resets the flag bit in the configuration register 302 to a logical '0'. Additionally, after receiving notification that the sampling process has been completed, the configuration information transfer module 323 increments the value provided at the selection input of the sample configuration selection multiplexer 324 to transfer the sampling configuration information for the next sample of the sampling sequence from the memory 113 to the configuration register 302. Once that sample is performed by the ADC module 300, the configuration information transfer module 323 again notifies the result transfer module 325 to transfer the sample result from the result register 310 to the memory 113, as described above. Thereafter, the transfer modules 323, 325 continue transferring sampling configuration information to the ADC module 300 from the memory 113 and transferring the corresponding sample results from the ADC module 300 to the memory 113 until the sampling sequence is completed, as described in greater detail below.

Figure 4:
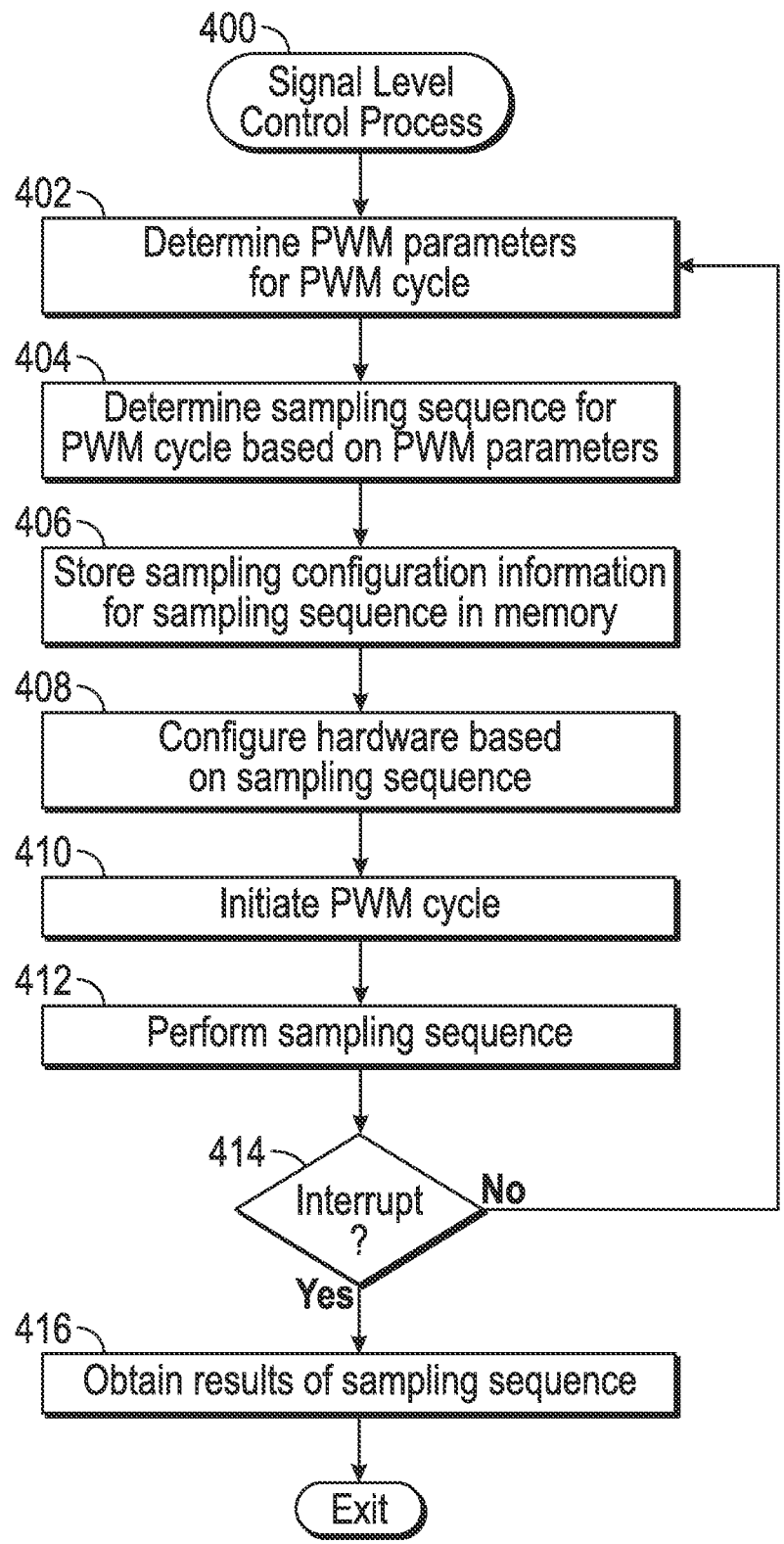
FIG. 4 is a flow diagram of a signal level control process suitable for use with the electrical system of FIG. 1 in accordance with one embodiment of the invention.

FIG. 4 depicts an exemplary embodiment of a signal level control process 400 suitable for implementation by an electrical system, such as electrical system 100, to regulate one or more signal levels using PWM controls. The various tasks performed in connection with the signal level control process 400 may be performed by hardware, firmware, software, or any combination thereof. For illustrative purposes, the following description of the signal level control process 400 may refer to elements mentioned above in connection with FIGS. 1-3, such as, for example, the processing module 112, the memory 113, the PWM module 114, the trigger pulse generation module 116, the ADC module 118, 300, and/or the DMA module 120, 320. It should be appreciated that the signal level control process 400 may include any number of additional or alternative tasks, the tasks need not be performed in the illustrated order and/or the tasks may be performed concurrently, and/or the signal level control process 400 may be incorporated into a more comprehensive procedure or process having additional functionality not described in detail herein. Moreover, one or more of the tasks shown and described in the context of FIG. 4 could be omitted from a practical embodiment of the signal level control process 400 as long as the intended overall functionality remains intact.

Referring to FIG. 4, and with continued reference to FIGS. 1-3, a signal level control process 400 may be performed by the electrical system 100 to control and/or regulate the signal level at the output of a transistor power stage 104 and/or the input 110 of an electrical load 106. In an exemplary embodiment, the signal level control process 400 initializes or begins by determining a set of PWM parameters for an upcoming PWM cycle (task 402). The set of PWM parameters should be understood as referring to the parameters and/or commands used by the PWM module 114 to generate PWM signals (e.g., square waves) having the desired duty cycle and/or scheduling for operating the various switches of the transistor power stage 104 to produce a desired voltage level at the output of the transistor power stage 104 (i.e., the input 110 of the electrical load 106). In this regard, in an exemplary embodiment, the processing module 112 determines the set of PWM parameters for the upcoming PWM cycle by comparing the measured voltage level(s) at the input 110 of the electrical load 106 from the previous PWM cycle (e.g., task 414) to a desired output voltage level. The processing module 112 provides the set of PWM parameters to the PWM module 114, which in turn generates the desired PWM signals for operating the transistor power stage 104 to produce the desired output voltage level.

In an exemplary embodiment, the signal level control process 400 continues by determining a desired sampling sequence for the upcoming PWM cycle based on the set of PWM parameters for the upcoming PWM cycle (task 404). As described above, in exemplary embodiments, the sampling sequence consists of a plurality of sampling processes which are arranged in a particular order based on the set of PWM parameters (or the expected PWM signals) for the upcoming PWM cycle, and the sampling sequence also includes or is otherwise associated with a sampling schedule (i.e., particular desired timing for each sample). In this manner, each sampling process of the plurality of sampling processes results in a digital value that represents to a particular analog signal level for a particular input to the ADC module 118, 300 at a particular instant in time. For each sampling process of the sampling sequence, the processing module 112 determines the desired timing for the respective sample and the desired input signal to the ADC module 118, 300 for sampling based on the set of PWM parameters. In conjunction with performing the sampling sequence (e.g., tasks 410, 412, 414), each sampling process results in a digital value (e.g., a "sample") corresponding to an analog-to-digital conversion performed by the ADC module 118, 300 on a particular input to the ADC module 118, 300 at a particular time, as described in greater detail below.

Figures 5, 7:
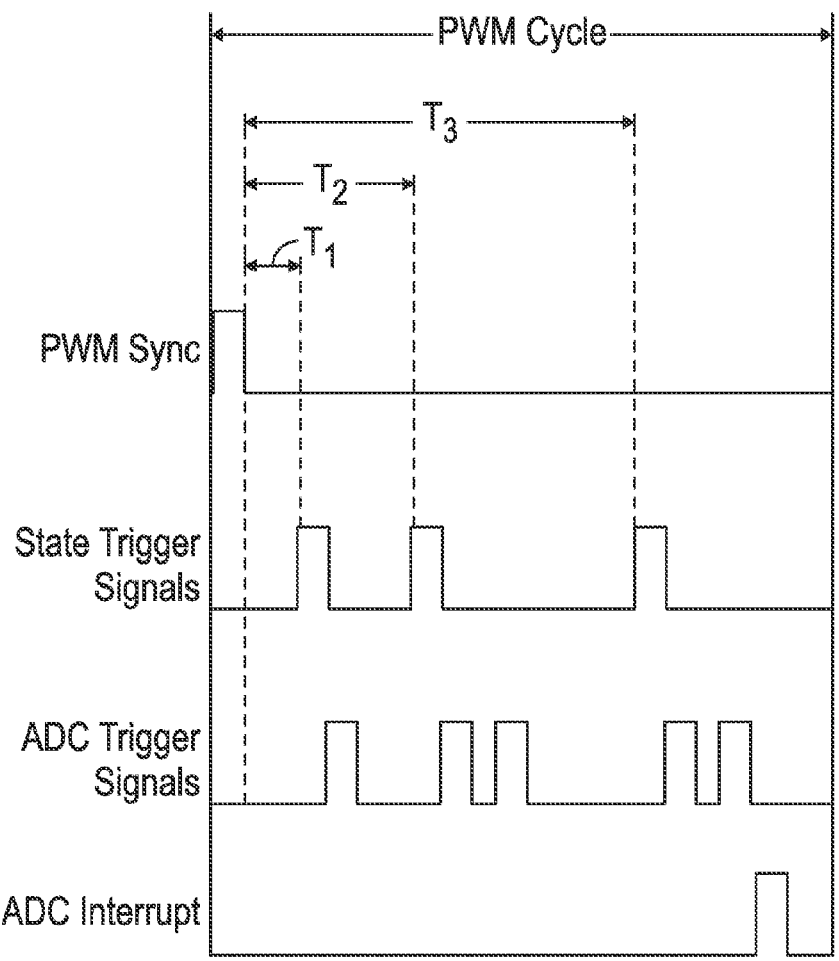
FIG. 5 is a table of an exemplary sampling sequence suitable for use with the signal level control process of FIG. 4 in accordance with one embodiment of the invention.
FIG. 7 is a diagram that includes graphs of various signals versus time for a modulation cycle associated with the operation of a signal level control process based on the sampling sequence of FIG. 5 for an exemplary embodiment of the invention.

FIG. 5 depicts an exemplary sampling sequence comprising five sampling processes arranged in order based on the sampling schedule. As shown, each sampling process is associated with a particular input and a particular sampling time after the beginning of the PWM cycle. For example, a first sampling process corresponds to sampling a first input ($IN_1$) of the ADC module 118, 300 at a first time ($T_1$), a second sampling process corresponds to sampling a second input ($IN_2$) of the ADC module 118, 300 at a second time ($T_2$), and so on. Depending on the particular PWM parameters, the processing module 112 may determine that it is desirable to perform sampling processes in a substantially simultaneous manner, that is, such that a second sampling process occurs immediately and/or automatically after a preceding sampling process (e.g., at the next possible sampling time). For example, it may be desirable to sample the same input multiple times in a substantially simultaneous manner and average the samples to obtain an average signal level for a particular instant in time. As shown, the third sampling process corresponds to automatically sampling the second input ($IN_2$) of the ADC module 118, 300 immediately (i.e., at the next possible sampling time) after the second sampling process ($T_2+\Delta$, where $\Delta$ is equal to the minimum amount of time between sampling processes) and the fifth sampling process corresponds to automatically sampling the third input ($IN_3$) of the ADC module 118, 300 immediately (e.g., at the next available sampling time) after the fourth sampling process ($T_3+\Delta$).

In an exemplary embodiment, the processing module 112 determines sampling mode criterion for each sampling process of the sampling sequence based on the sampling schedule. In this regard, the sampling mode criterion indicates whether a sample should be automatically obtained, or alternatively, obtained in response to a hardware trigger event. For example, as described in greater detail below, a sampling mode control bit equal to a logical '0' indicates a sampling process to be performed immediately and/or automatically after the preceding sampling process (e.g., automatic sampling mode) while a sampling mode control bit equal to logical '1' corresponds to a sampling process to be performed at a particular time within the PWM cycle. In other words, a sampling mode control bit equal to logical '0' corresponds to a sampling time referenced relative to the preceding sampling process, whereas a sampling mode control bit equal to logical '1' corresponds to a sampling time reference relative to an external event (e.g., a time relative to the sync signal indicating the beginning of the PWM cycle). As shown, the sampling mode criterion for the first, second, and fourth sampling processes are determined as logical '1', as the timing for each of the respective sampling processes is referenced relative to the beginning of the PWM cycle, whereas the sampling mode criterion for the third and fifth sampling processes are determined as logical '0', indicating the timing for each of the third and fifth sampling processes is referenced relative to the timing of the preceding sample conversion. As a result, a time interval (or difference) between the first sampling process and the second sampling process (e.g., $T_2-T_1$) may be different than a time interval between the second sampling process and the third sampling process (e.g., $\Delta$), which may be different than a time interval between the third sampling process and the fourth sampling process (e.g., $T_3-T_2-\Delta$), and so on. In this regard, the sampling time for each sampling process of the sampling sequence may be independent of the other sampling processes of the sampling sequence. Thus, the sampling sequence is nonperiodic, that is, at least one sampling process does not occur at regular intervals with respect to the preceding and/or succeeding sampling processes. It should be noted that although the sampling mode criterion is described herein as a single-bit value for purposes of explanation, the sampling mode criterion may be implemented using additional bits and the subject matter is not intended to be limited to single-bit sampling mode criterion. In addition to sampling mode criterion for the sampling processes of the sampling sequence, the processing module 112 also determines other configuration information for the sampling processes, such as, for example, a desired amplifier gain and whether an interrupt should be generated after the sampling process. For example, as illustrated in FIG. 5, the processing module 112 may determine the interrupt enable criterion for the last sampling process of the sampling sequence should be a logical '1', so that the processing module 112 receives an indication that the sampling process results for the sampling sequence are available once the sampling sequence has completed.

Referring again to FIG. 4, and with continued reference to FIGS. 1-3 and 5, the signal level control process 400 continues by storing the sampling configuration information for the sampling processes of the sampling sequence for the upcoming PWM cycle to memory (task 406). In this regard, the processing module 112 writes the bits of sample configuration information for the sampling sequence to the block of memory 113 corresponding to the sampling sequence via the bus interface 115. For example, for each sampling process of the sampling sequence, the processing module 112 writes the input channel selection bits, gain control bits, sampling mode control bit, and interrupt enable bit for that sampling process to an address (or location) in memory 113 corresponding to that respective sampling process of the sampling sequence. In exemplary embodiments, the sampling configuration information is written to an address (or location) in the memory 113 that is proximate to the address (or location) of the sample for the preceding sampling process of the sampling sequence in memory 113 to facilitate incrementing through the sampling processes of the sampling sequence by the sample configuration selection multiplexer 324.

After storing the sampling configuration information for the sampling sequence in memory, the signal level control process 400 continues by configuring the hardware components of the controller for the upcoming PWM cycle based on the sampling sequence (task 408). In an exemplary embodiment, the processing module 112 configures the trigger pulse generation module 116, 200 to generate timing trigger signals corresponding to the particular timing references after the PWM sync signal based on the sampling schedule for the sampling sequence. For example, using the sampling sequence of FIG. 5 as an example, the processing module 112 may configure the first register 210 to contain (or store) a value corresponding to $T_1$, the second register 212 to contain a value corresponding to $T_2$, and the third register 214 to contain a value corresponding to $T_3$. The processing module 112 may also configure each of the remaining registers 204 (e.g., registers for $T_4$ through $T_N$) which are not being used for the current sampling sequence to contain (or store) a null value or another suitable value such that the trigger pulse generation module 200 does not generate any undesired timing trigger signals that may interfere with the proper execution of the sampling sequence. In this manner, the trigger pulse generation module 116, 200 generates a plurality of timing trigger signals based on the sampling schedule during execution of the upcoming PWM cycle.

After configuring the hardware components for the upcoming PWM cycle, the signal level control process 400 continues by initiating the upcoming PWM cycle (task 410). Depending on the embodiment, the processing module 112 may indicate to the PWM module 114 to begin the PWM cycle or the PWM module 114 may begin the PWM cycle automatically (e.g., without interaction of the processing module 112). The PWM module 114 generates PWM signals for the PWM cycle based on the set of PWM parameters determined and/or provided to the PWM module 114, as set forth above (e.g., task 402). Additionally, the processing module 112 may reset or otherwise initialize the DMA module 120, 320 (e.g., by resetting the transfer modules 323, 325 of the DMA control module 322 to their initial states) to transfer the sampling configuration information for the initial sampling process of the sampling sequence from the memory 113 to the ADC module 118, 300 (e.g., configuration register 302).

In an exemplary embodiment, the signal level control process 400 continues by performing the sampling sequence determined above (e.g., task 404) until receiving an interrupt signal (tasks 412, 414). For example, the PWM module 114 may generate a sync signal when the PWM module 114 begins execution of the set of PWM parameters for the PWM cycle. In response to the sync signal 216 from the PWM module 114, the counter 202 within the trigger pulse generation module 200 begins counting upwards, such that the trigger pulse generation module 200 generates a plurality of timing trigger signals 218 at predetermined times (e.g., based on values stored in the registers 204) after the sync signal 216. The DMA module 120, 320 sequentially transfers the sampling configuration information for each sampling process from the memory 113 to the ADC module 118, 300, which obtains each respective sample corresponding to the sampling processes of the sampling sequence in accordance with the sampling configuration information either automatically or in response to a trigger signal from the trigger pulse generation module 116, 200, and the DMA module 120, 320 sequentially transfers the sample result for each sampling process from the ADC module 118, 300 to the memory 113, as described in greater detail below with reference to FIG. 6. In exemplary embodiments, the ADC module 118, 300 generates or otherwise provides an interrupt signal to the processing module 112 based on the sampling configuration information for a respective sampling process of the sampling sequence. In response to the interrupt signal, the signal level control process 400 continues by obtaining the results of the sampling sequence, that is, the digital values corresponding to the plurality of sampling processes of the sampling sequence (task 414). In this regard, the processing module 112 accesses the memory 113 to retrieve or otherwise obtain the digital result values for the plurality of sampling processes of the sampling sequence that have been performed prior to the interrupt signal.

In exemplary embodiments, the processing module 112 utilizes the digital result values for the sampling processes of the sampling sequence determine a set of PWM parameters for the next PWM cycle (e.g., task 402). For example, the processing module 112 may determine PWM parameters for the next PWM cycle based upon the measured digital values by comparing the digital values obtained by the ADC module 118, 300 for the various analog input channels that were sampled to the desired (or expected) values (e.g., values corresponding to the desired analog signal levels) for those analog input channels. In this regard, the signal level control process 400 may repeat the loop defined by tasks 402, 404, 406, 408, 410, 412, 414, and 416 as desired during operation of the electrical system 100 to determine a new set of modulation parameters for the next PWM cycle based on the digital values corresponding to the plurality of samples from the previous PWM cycle, determine a sampling sequence based on the new set of modulation parameters, store the sampling configuration information to effectuate the sampling sequence to memory, and configure the controller hardware based on the sampling sequence, in a similar manner as described above.

Figure 6:
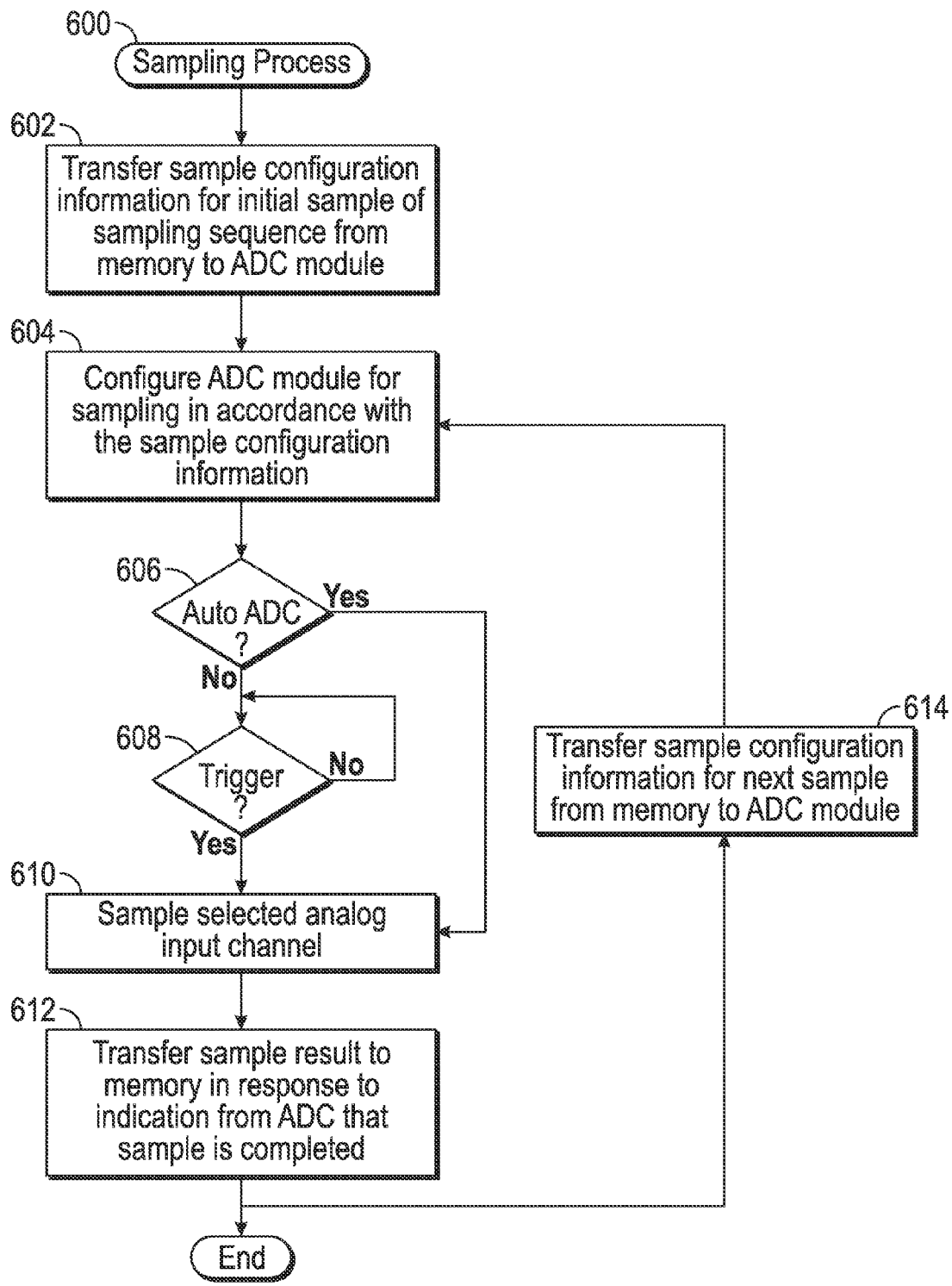
FIG. 6 is a flow diagram of a sampling process suitable for use with the signal level control process of FIG. 4 in accordance with one embodiment.

FIG. 6 depicts an exemplary embodiment of a sampling process 600 suitable for implementation by a DMA module and an ADC module in an electrical system, such as the DMA module 120, 320 and the ADC module 118, 300 in electrical system 100, to support nonperiodic sampling in connection with the signal level control process 400 of FIG. 4. The various tasks performed in connection with the sampling process 600 may be performed by hardware, firmware, software, or any combination thereof. For illustrative purposes, the following description of the sampling process 600 may refer to elements mentioned above in connection with FIGS. 1-3, such as, for example, the ADC module 118, 300, the DMA module 120, 320, the DMA control module 322, the configuration information transfer modules 323, the result transfer module 325, the sample configuration selection multiplexer 324, the sample result selection demultiplexer 326, the ADC 308, the input channel selection multiplexer 304 and/or the sampling mode multiplexer 312. It should be appreciated that the sampling process 600 may include any number of additional or alternative tasks, the tasks need not be performed in the illustrated order and/or the tasks may be performed concurrently, and/or the sampling process 600 may be incorporated into a more comprehensive procedure or process having additional functionality not described in detail herein. Moreover, one or more of the tasks shown and described in the context of FIG. 6 could be omitted from a practical embodiment of the sampling process 600 as long as the intended overall functionality remains intact.

In exemplary embodiments, the sampling process 600 begins by transferring the sampling configuration information for an initial sampling process of a sampling sequence from memory to the conversion module (task 602). As described above in the context of FIG. 3, in its initial state, the configuration information transfer module 323 provides, to the selection input of the sample configuration selection multiplexer 324, a value corresponding to the address (or location) in memory 113 associated with the sampling configuration information for the initial sampling process of the sampling sequence so that the sample configuration selection multiplexer 324 transfers the bits of sampling configuration information for the initial sampling process from that location in memory 113 to the configuration register 302.

After transferring the sampling configuration information from the memory to the conversion module, the sampling process 600 continues by configuring the components of the conversion module for obtaining the initial sample in accordance with the sampling configuration information (task 604). As described above in the context of FIG. 3, the input channel selection bits are provided to the selection input of the input channel selection multiplexer 304 to provide the desired analog input channel to the ADC 308, the gain control bits are provided to the gain control input of the amplifier arrangement 306 to provide the desired gain to the analog signal at the output of the input channel selection multiplexer 304, and the sampling mode control bit is provided to the sampling mode multiplexer 312 to provide the desired triggering signal to the trigger input of the ADC 308. In this manner, the ADC module 118, 300 automatically configures itself for sampling in accordance with the sampling configuration information once the sampling configuration information is provided in the configuration register 302.

In exemplary embodiments, the sampling process 600 continues by identifying or otherwise determining whether the sampling configuration information for the current sampling process indicates an automatic sampling mode or a triggered sampling mode, automatically sampling the analog signal level at the input of the ADC when the sampling configuration information indicates the automatic sampling mode, and waiting for an external triggering signal before sampling the analog signal level at the input of the ADC when the sampling configuration information indicates the triggered sampling mode (tasks 606, 608, 610). As described above in the context of FIG. 3, when the sampling mode control bit indicates the automatic sampling mode, the sampling mode multiplexer 312 automatically provides an ADC triggering signal to the trigger input of the ADC 308 to cause the ADC 308 to sample the analog signal level at its analog input, which corresponds to the analog input channel selected by the input channel selection multiplexer 304 multiplied by the desired gain provided by the amplifier arrangement 306. Conversely, when the sampling mode control bit indicates the triggered sampling mode, the sampling mode multiplexer 312 automatically provides a path for an external trigger signal from the trigger pulse generation module 116, 200 to the trigger input of the ADC 308, which, in turn, causes the ADC 308 to wait until a trigger signal is generated by the trigger pulse generation module 116, 200 before sampling the analog signal level at its analog input. As described above in the context of FIG. 3, after the ADC 308 performs the sampling, the ADC 308 stores the digital result value corresponding to the analog signal level at that instant in time in the result register 310 and sets the completion flag bit in the configuration register 302 to a logical '1' to indicate that the sampling process has been performed.

In exemplary embodiments, the sampling process 600 continues by transferring the result of the sampling process from the conversion module to the memory in response to an indication that the sample has been obtained (task 612). As described above in the context of FIG. 3, in one embodiment, the configuration information transfer module 323 monitors the completion flag bit in the configuration register 302, and in response to the completion flag bit indicating the sampling has been completed, the configuration information transfer module 323 notifies the result transfer module 325 to transfer the sampling process result from the result register 310 to the memory 113. In other embodiments, the result transfer module 325 may independently monitor the completion flag bit in the configuration register 302. For the initial sampling process of the sequence, the result transfer module 325 provides, to the selection input of the sample result selection demultiplexer 326, a value corresponding to the address (or location) in memory 113 for the result of the initial sample of the sampling sequence so that the sample result selection demultiplexer 326 transfers the bits of digital result value for the initial sampling process from the result register 310 to that location in memory 113. After the sampling process result is transferred to the memory 113, the result transfer module 325 sets the completion flag bit in the configuration register 302 to a logical '0' to indicate that the sampling process result has been transferred.

After transferring the sampling process result to memory, the sampling process 600 continues by transferring the sampling configuration information for the next sampling process of the sampling sequence from memory to the conversion module (task 614). As described above in the context of FIG. 3, in response to the completion flag bit indicating the sampling process has been completed, the configuration information transfer module 323 increments the value provided to the selection input of the sample configuration selection multiplexer 324 to transfer the sampling configuration information for the next sampling process of the sampling sequence from the address (or location) in memory 113 corresponding to the subsequent sampling process of the sampling sequence, which is proximate (or adjacent to) the address (or location) of the preceding sampling process. Once the sampling configuration information for the next sampling process is transferred to the configuration register 302, the sampling process 600 continues by configuring the input channel selection multiplexer 304, the amplifier arrangement 306, and the sampling mode multiplexer 312 in accordance with the sampling configuration information for that sampling process (task 604) and thereafter obtaining the sample either automatically or in response to a triggering signal (tasks 606, 608, 610) and transferring the sampling process result from the result register 310 to the memory 113 (task 612), as described above. In this regard, the loop defined by tasks 604, 606, 608, 610, 612 and 614 may repeat throughout a PWM cycle to complete a nonperiodic sampling sequence and obtain a sample corresponding to each sampling process of the sampling sequence in accordance with its associated sampling configuration information.

FIG. 7 illustrates signals within the electrical system 100 over a PWM cycle for the sampling sequence of FIG. 5 in conjunction with the signal level control process 400 of FIG. 4 and the sampling process 600 of FIG. 6. In the illustrated embodiment, the PWM module 114 generates a sync signal 216 (PWM SYNC) at the beginning of the PWM cycle. In response to the sync signal 216 from the PWM module 114, the counter 202 of the trigger pulse generation module 200 begins incrementing on the next rising clock edge. The DMA module 120, 320 transfers the sampling configuration information for the initial sampling process of the sampling sequence from the memory 113 to the configuration register 302, and once the sampling configuration information is transferred to the configuration register 302, the input channel selection multiplexer 304 is operated to provide the first analog input channel ($IN_1$) to the ADC 308 and the sampling mode multiplexer 312 is operated to provide the output of the trigger pulse generation module 116, 200 to the trigger input of the ADC 308 to wait for an external timing trigger signal before obtaining or otherwise performing the first sampling process. When the counter 202 of the trigger pulse generation module 200 is equal to the value corresponding to the first time ($T_1$), the trigger pulse generation module 200 generates a first timing trigger signal 218 that is provided to the trigger input of the ADC 308 via the sampling mode multiplexer 312 to cause the ADC 308 to convert the analog signal level of the first input ($IN_1$) at the first time ($T_1$) to a corresponding digital value, store the digital value in the result register 310, and set the completion flag bit in the configuration register 302 to a logical '1'. In response to the indication that the first sampling process is completed, the result transfer module 325 operates the sample result selection demultiplexer 326 to transfer the first sampling process result from the result register 310 to the memory 113 and the configuration information transfer module 323 operates the sample configuration selection multiplexer 324 to transfer the sample configuration information for the second sampling process of the sampling sequence from the memory 113 to the configuration register 302.

Once the sampling configuration information for the second sampling process is transferred to the configuration register 302, the input channel selection multiplexer 304 is operated to provide the second analog input channel ($IN_2$) to the ADC 308 and the sampling mode multiplexer 312 is operated to provide the output of the trigger pulse generation module 116, 200 to the trigger input of the ADC 308 to wait for an external timing trigger signal before obtaining or otherwise performing the second sampling process. When the counter 202 of the trigger pulse generation module 200 is equal to the value corresponding to the second time ($T_2$), the trigger pulse generation module 200 generates a second timing trigger signal 218 that is provided to the trigger input of the ADC 308 via the sampling mode multiplexer 312 to cause the ADC 308 to convert the analog signal level of the second input ($IN_2$) at the second time ($T_2$) to a corresponding digital value, store the digital value in the result register 310, and set the completion flag bit in the configuration register 302 to a logical '1'. In response to the indication that the second sampling process is completed, the result transfer module 325 operates the sample result selection demultiplexer 326 to transfer the second sampling process result from the result register 310 to the memory 113 and the configuration information transfer module 323 operates the sample configuration selection multiplexer 324 to transfer the sample configuration information for the third sampling process of the sampling sequence from the memory 113 to the configuration register 302.

When the sampling configuration information for the third sampling process is transferred to the configuration register 302, the sampling mode multiplexer 312 is operated to provide the inverse of the sampling control bit to the trigger input of the ADC 308 and immediately trigger the ADC 308, and thereby automatically obtain the third sample without waiting for an external timing trigger signal. As a result, the ADC 308 converts the analog signal level of the second input ($IN_2$) at the next possible sampling time ($T_2+\Delta$) to a corresponding digital value, stores the digital value in the result register 310, and sets the completion flag bit in the configuration register 302 to a logical '1'. Thereafter, the result transfer module 325 operates the sample result selection demultiplexer 326 to transfer the third sampling process result from the result register 310 to the memory 113 and the configuration information transfer module 323 operates the sample configuration selection multiplexer 324 to transfer the sample configuration information for the fourth sampling process of the sampling sequence from the memory 113 to the configuration register 302.

Once the sampling configuration information for the fourth sampling process is transferred to the configuration register 302, the input channel selection multiplexer 304 is operated to provide the third analog input channel ($IN_3$) to the ADC 308 and the sampling mode multiplexer 312 is operated to provide the output of the trigger pulse generation module 116, 200 to the trigger input of the ADC 308 to wait for an external timing trigger signal before obtaining the fourth sample or otherwise performing the fourth sampling process. When the counter 202 of the trigger pulse generation module 200 is equal to the value corresponding to the third time ($T_3$), the trigger pulse generation module 200 generates a third timing trigger signal 218 that is provided to the trigger input of the ADC 308 via the sampling mode multiplexer 312 to cause the ADC 308 to convert the analog signal level of the third input ($IN_3$) at the third time ($T_3$) to a corresponding digital value, store the digital value in the result register 310, and set the completion flag bit in the configuration register 302 to a logical '1'. Thereafter, the result transfer module 325 operates the sample result selection demultiplexer 326 to transfer the fourth sampling process result from the result register 310 to the memory 113 and the configuration information transfer module 323 operates the sample configuration selection multiplexer 324 to transfer the sample configuration information for the fifth sampling process of the sampling sequence from the memory 113 to the configuration register 302. When the sampling configuration information for the fifth sampling process is transferred to the configuration register 302, the sampling mode multiplexer 312 is operated to immediately trigger the ADC 308, and thereby automatically obtain the fifth sample by converting the analog signal level of the third input ($IN_3$) at the next possible sampling time ($T_3+\Delta$) to a corresponding digital value. The ADC 308 stores the digital value in the result register 310 and sets the completion flag bit in the configuration register 302 to a logical '1', and the result transfer module 325 operates the sample result selection demultiplexer 326 to transfer the fifth sampling process result from the result register 310 to the memory 113. Additionally, the ADC 308 identifies the interrupt enable bit in the configuration register 302 as indicating the interrupt is enable and generates or otherwise provides an interrupt signal to the processing module 112 after performing the fifth sampling process. In response to the interrupt signal, the processing module 112 may access the memory 113 to obtain the sampling process results for the sampling sequence from memory 113 and determine PWM parameters for the subsequent PWM cycle, as described above in the context of FIG. 4.

To briefly summarize, one advantage of the subject matter described above is that the sampling processes for a nonperiodic sampling sequence may be scheduled and obtained at irregular intervals using hardware components with minimal processing and/or software overhead by using a DMA module. The sampling processes may be scheduled to occur at a particular time relative to the beginning of the PWM cycle or relative to a previous sampling process (e.g., automatically after a previous sampling process). Once the hardware is configured for the sampling sequence, the sampling sequence may be completed without any interrupt service requests or software overhead related to executing the sampling sequence. Additionally, by using the DMA module to transfer sampling configuration information and sampling process results from/to the memory to/from the conversion module the area footprint of the conversion module may be reduced by reducing the number of registers required to maintain sampling configuration information and sampling process results for multiple sampling processes of the sampling sequence within the conversion module.

For the sake of brevity, conventional techniques related to signal processing, sampling, sensing, analog-to-digital conversion, computer architecture, pulse-width modulation, direct memory access, and other functional aspects of the subject matter may not be described in detail herein. In addition, certain terminology may also be used herein for the purpose of reference only, and thus are not intended to be limiting. For example, the terms "first", "second" and other such numerical terms referring to structures do not imply a sequence or order unless clearly indicated by the context.

In conclusion, systems, devices, and methods configured in accordance with example embodiments of the invention relate to:

In one exemplary embodiment, a method of performing a sequence of a plurality of sampling processes by a control module is provided. The method comprises transferring configuration information for the sequence from memory to a conversion module, wherein the conversion module performs the sequence of sampling processes in accordance with the configuration information by sampling one or more analog signals at a plurality of sampling times to obtain a plurality of samples, at least some sampling times of the plurality of sampling times being nonperiodic with respect to the other sampling times of the plurality of sampling times, and transferring results corresponding to the plurality of samples from the conversion module to the memory. In one embodiment, transferring the results comprises, for each result corresponding to a respective sample of the plurality of samples, transferring the result from the conversion module to the memory in response to an indication that the respective sampling process has been performed by the conversion module. In a further embodiment, transferring the result from the conversion module to the memory comprises storing the result at a location in the memory corresponding to the respective sample. In one embodiment, the method further comprises writing, by a processing module, the configuration information for the sequence to the memory and obtaining, by the processing module, the results of the sequence from the memory. In a further embodiment, the configuration information includes an interrupt criterion for a sample of the plurality of samples, the method further comprising generating, by the conversion module, an interrupt based on the interrupt criterion after the sample is obtained, wherein the processing module obtains the results from the memory in response to the interrupt. In yet another embodiment, the control module includes a direct memory access module coupled between the memory and the conversion module, wherein transferring the configuration information comprises the direct memory access module transferring the configuration information from the memory to the conversion module and transferring the results comprises the direct memory access module transferring the results from the conversion module to the memory. In one embodiment, the direct memory access module transfers a subset of the configuration information corresponding to an initial sampling process of the sequence from the memory to the conversion module, the subset of the configuration information including a sampling mode criterion, wherein the method further comprises automatically performing, by the conversion module, the initial sampling process when the sampling mode criterion indicates a first sampling mode; and performing, by the conversion module, the initial sampling process in response to a trigger signal when the sampling mode criterion indicates a second sampling mode. In a further embodiment, the method further comprises transferring, by the direct memory access module, a second subset of the configuration information corresponding to a second sampling process of the sequence from the memory to the conversion module after the initial sampling process is performed, the second sampling process following the initial sampling process in the sequence, the second subset of the configuration information including a second sampling mode criterion, automatically performing, by the conversion module, the second sampling process when the second sampling mode criterion indicates the first sampling mode, and performing, by the conversion module, the second sampling process in response to a second trigger signal when the second sampling mode criterion indicates the second sampling mode. In accordance with yet another embodiment, the method comprises for each sampling process of the plurality of sampling processes, automatically performing, by the conversion module, the sampling process when a subset of the configuration information corresponding to that sample indicates a first sampling mode and performing, by the conversion module, the sampling process in response to a trigger signal when the subset indicates a second sampling mode. In another embodiment, the method further comprises writing, by a processing module, the configuration information to a block of addresses in the memory, wherein a direct memory access module sequentially transfers the configuration information from the block of addresses in the memory to the conversion module. In one embodiment, the direct memory access module sequentially transfers the results from the conversion module to a second block of addresses in the memory, and wherein the method further comprises obtaining, by the processing module, the results from the second block of addresses in the memory. In another embodiment, the method further comprises determining, by the processing module, configuration information for a second sequence of sampling processes based on the results, writing, by the processing module, the configuration information for the second sequence to the block of addresses in the memory, sequentially transferring, by the direct memory access module, the configuration information for the second sequence from the block of addresses in the memory to the conversion module, wherein the conversion module performs the second sequence of sampling processes in accordance with the configuration information, sequentially transferring, by the direct memory access module, the results of the second sequence of sampling processes from the conversion module to the second block of addresses in the memory, and obtaining, by the processing module, the results of the second sequence of sampling processes from the second block of addresses in the memory.

In accordance with another exemplary embodiment, a method comprises transferring sampling configuration information for a first sample from memory to a conversion module, wherein the conversion module obtains the first sample in accordance with the sampling configuration information either automatically or in response to a triggering signal based on a subset of the sampling configuration information that corresponds to a sampling mode criterion, and transferring a result of the first sample from the conversion module to the memory. In one embodiment, the method further comprises identifying, by a direct memory access module coupled between the memory and the conversion module, an indication the first sample has been obtained by the conversion module, the direct memory access module transferring the sampling configuration information from the memory to the conversion module, wherein transferring the result comprises transferring the result in response to receiving the indication. In a further embodiment, the direct memory access module includes a first transfer module and a second transfer module, and the method further comprises incrementing the first transfer module in response to receiving the indication to transfer second sampling configuration information for a second sample from the memory to the conversion module, the second sample following the first sample in a sampling sequence, and incrementing the second transfer module in response to receiving the indication to transfer the result to a location in the memory corresponding to the first sample. In one embodiment, the method further comprises identifying, by the direct memory access module, the indication the first sample has been obtained by the conversion module, the conversion module obtaining the second sample in accordance with the second sampling configuration information either automatically or in response to a second triggering signal based on a subset of the second sampling configuration information that corresponds to a second sampling mode criterion, incrementing the first transfer module in response to receiving a second indication to transfer third sampling configuration information for a third sample from the memory to the conversion module, the third sample following the second sample in the sampling sequence, and incrementing the second transfer module in response to receiving the second indication to transfer a second result of the second sample from the conversion module to a second location in the memory corresponding to the second sample. In another embodiment, the method further comprises transferring second sampling configuration information for a second sample from the memory to the conversion module after the first sample is obtained, the second sample following the first sample in a sampling sequence, wherein the conversion module obtains the second sample in accordance with the second sampling configuration information either automatically or in response to a second triggering signal based on a subset of the second sampling configuration information that corresponds to a second sampling mode criterion, and transferring a second result of the second sample from the conversion module to the memory. In one embodiment, the method further comprises transferring third sampling configuration information for a third sample from the memory to the conversion module after the second sample is obtained, the third sample following the second sample in the sampling sequence, wherein the conversion module obtains the third sample in accordance with the third sampling configuration information either automatically or in response to a third triggering signal based on a subset of the third sampling configuration information that corresponds to a third sampling mode criterion, and transferring a third result of the second sample from the conversion module to the memory, wherein the first sample is obtained at a first sampling time, the second sample is obtained at a second sampling time, the third sample is obtained at a third sampling time, and a first difference between the first sampling time and the second sampling time is not equal to a second difference between the second sampling time and the third sampling time.

In yet another exemplary embodiment, a control module is provided that comprises a memory, a processing module, a conversion module, and a direct memory access module. The processing module is coupled to the memory to write configuration information for a sampling sequence to the memory and obtain results corresponding to the sampling sequence from the memory, wherein the sampling sequence comprises a plurality of sampling processes. The conversion module performs the sampling sequence in accordance with the configuration information by performing sampling processes at a plurality of sampling times to obtain the results, wherein at least some sampling times of the plurality of sampling times are nonperiodic with respect to the other sampling times of the plurality of sampling times. The direct memory access module is coupled between the memory and the conversion module to transfer the configuration information for the sampling sequence from the memory to the conversion module and transfer the results from the conversion module to the memory. In one embodiment, the direct memory access module sequentially transfers sampling configuration information for individual sampling processes of the sampling sequence from the memory and sequentially transfers sample results for individual sampling processes of the sampling sequence from the conversion module to the memory in response to indications from the conversion module that sampling processes have been performed.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of performing a sequence of a plurality of sampling processes by a control module, the method comprising:

sequentially transferring, by a direct memory access module, configuration information for each of the sampling processes of the sequence from memory to a configuration register of the conversion module, wherein the conversion module performs the sequence of sampling processes in accordance with a sampling mode control bit of the configuration information in the configuration register by sampling one or more analog signals at a plurality of sampling times either automatically or in response to an external triggering signal based on the sampling mode control bit in the configuration register to obtain a plurality of samples, the sampling mode control bit of the configuration register being coupled to a selection input of a sampling mode multiplexer controlling whether the external triggering signal is provided to a trigger input of a converter of the conversion module, the converter sampling the one or more analog signals, a result of each sample being stored in a result register of the conversion module, at least some sampling times of the plurality of sampling times being nonperiodic with respect to the other sampling times of the plurality of sampling times; and sequentially transferring, by the direct memory access module, results corresponding to the plurality of samples from the result register of the conversion module to the memory.

2. The method of claim 1, wherein transferring the results comprises, for each result corresponding to a respective sample of the plurality of samples, transferring the result from the result register of the conversion module to the memory in response to an indication that the respective sampling process has been performed by the conversion module.

3. The method of claim 2, wherein transferring the result from the result register of the conversion module to the memory comprises storing the result at a location in the memory corresponding to the respective sample.

4. The method of claim 1, further comprising:
writing, by a processing module, the configuration information for the sequence to the memory; and
obtaining, by the processing module, the results of the sequence from the memory.

5. The method of claim 4, wherein the configuration information includes an interrupt criterion for a sample of the plurality of samples, the method further comprising generating, by the conversion module, an interrupt based on the interrupt criterion after the sample is obtained, wherein the processing module obtains the results from the memory in response to the interrupt.

6. The method of claim 1, wherein the direct memory access module transfers a subset of the configuration information corresponding to an initial sampling process of the sequence from the memory to the configuration register of the conversion module, the subset of the configuration information including a sampling mode control bit, and wherein the method further comprises:
automatically performing, by the conversion module, the initial sampling process when the sampling mode control bit indicates a first sampling mode; and
performing, by the conversion module, the initial sampling process in response to the external trigger signal when the sampling mode control bit indicates a second sampling mode.

7. The method of claim 6, further comprising:
transferring, by the direct memory access module, a second subset of the configuration information corresponding to a second sampling process of the sequence from the memory to the configuration register of the conversion module after the initial sampling process is performed, the second sampling process following the initial sampling process in the sequence, the second subset of the configuration information including a second sampling mode control bit;
automatically performing, by the conversion module, the second sampling process when the second sampling mode control bit indicates the first sampling mode; and
performing, by the conversion module, the second sampling process in response to the external trigger signal when the second sampling mode control bit indicates the second sampling mode.

8. The method of claim 1, further comprising, for each sampling process of the plurality of sampling processes:
automatically performing, by the conversion module, the sampling process when the sampling mode control bit of the configuration information corresponding to that sample indicates a first sampling mode; and
performing, by the conversion module, the sampling process in response to a trigger signal when the sampling mode control bit indicates a second sampling mode.

9. The method of claim 1, further comprising writing, by a processing module, the configuration information to a block of addresses in the memory, wherein the direct memory access module sequentially transfers the configuration information from the block of addresses in the memory to the configuration register of the conversion module.

10. The method of claim 9, wherein the direct memory access module sequentially transfers the results from the result register of the conversion module to a second block of addresses in the memory, and wherein the method further comprises obtaining, by the processing module, the results from the second block of addresses in the memory.

11. The method of claim 10, further comprising:
determining, by the processing module, configuration information for a second sequence of sampling processes based on the results;
writing, by the processing module, the configuration information for the second sequence to the block of addresses in the memory;
sequentially transferring, by the direct memory access module, the configuration information for the second sequence from the block of addresses in the memory to the conversion module, wherein the conversion module performs the second sequence of sampling processes in accordance with the configuration information;
sequentially transferring, by the direct memory access module, the results of the second sequence of sampling processes from the conversion module to the second block of addresses in the memory; and
obtaining, by the processing module, the results of the second sequence of sampling processes from the second block of addresses in the memory.

12. A method comprising:
transferring, by a direct memory access module coupled between memory and a conversion module, sampling configuration information for a first sample of a sampling sequence from the memory to a configuration register of the conversion module, wherein the conversion module obtains the first sample in accordance with the sampling configuration information in the configuration register either automatically or in response to a triggering signal based on a subset of the sampling configuration information that corresponds to a sampling mode control bit, the sampling mode control bit of the configuration register being coupled to a selection input of a sampling mode multiplexer controlling whether the triggering signal is provided to a trigger input of a converter of the conversion module, a result of the first sample being stored in a result register of the conversion module; and
in response to identifying an indication the first sample has been obtained by the conversion module:
transferring, by the direct memory access module, the result of the first sample from the result register to the memory; and
transferring, by the direct memory access module, second sampling configuration information for a second sample of the sampling sequence from the memory to the configuration register, the second sample following the first sample in the sampling sequence, wherein the conversion module obtains the second sample in accordance with the second sampling configuration information in the configuration register either automatically or in response to a second triggering signal based on a subset of the second sampling configuration information that corresponds to a second sampling mode control bit.

13. The method of claim 12, the direct memory access module including a first transfer module and a second transfer module, the method further comprising, in response to receiving the indication:
incrementing the first transfer module to transfer the second sampling configuration information for the second sample from the memory to the configuration register of the conversion module; and
incrementing the second transfer module to transfer the result from the result register to a location in the memory corresponding to the first sample.

14. The method of claim 13, further comprising, in response to receiving a second indication:
incrementing the first transfer module to transfer third sampling configuration information for a third sample from the memory to the configuration register of the conversion module, the third sample following the second sample in the sampling sequence; and
incrementing the second transfer module to transfer a second result of the second sample from the result register of the conversion module to a second location in the memory corresponding to the second sample.

15. The method of claim 12, further comprising:
transferring a second result of the second sample from the result register of the conversion module to the memory.

16. The method of claim 15, further comprising:
transferring third sampling configuration information for a third sample from the memory to the configuration register of the conversion module after the second sample is obtained, the third sample following the second sample in the sampling sequence, wherein the conversion module obtains the third sample in accordance with the third sampling configuration information either automatically or in response to a third triggering signal based on a subset of the third sampling configuration information that corresponds to a third sampling mode control bit; and
transferring a third result of the second sample from the result register of the conversion module to the memory, wherein:
the first sample is obtained at a first sampling time;
the second sample is obtained at a second sampling time;
the third sample is obtained at a third sampling time; and
a first difference between the first sampling time and the second sampling time is not equal to a second difference between the second sampling time and the third sampling time.

17. A control module comprising:
a memory;
a processing module coupled to the memory to write configuration information for a sampling sequence to the memory and obtain results corresponding to the sampling sequence from the memory, wherein the sampling sequence comprises a plurality of sampling processes;
a conversion module to perform the sampling sequence in accordance with the configuration information by performing sampling processes at a plurality of sampling times to obtain the results, wherein at least some sampling times of the plurality of sampling times are non-periodic with respect to the other sampling times of the plurality of sampling times, the conversion module comprising: a converter to perform the sampling, a configuration register including a sampling mode control bit, and a multiplexer coupled to a trigger input of the converter, wherein the sampling mode control bit is coupled to a selection input of the multiplexer to control whether an external trigger signal is provided to the trigger input; and a direct memory access module coupled between the memory and the conversion module to transfer the configuration information for the sampling sequence from the memory to the conversion module and transfer the results from the conversion module to the memory, wherein the direct memory access module sequentially transfers sampling configuration information for individual sampling processes of the sampling sequence from the memory to the configuration register of the conversion module and sequentially transfers sample results for individual sampling processes of the sampling sequence from a result register of the conversion module to the memory in response to indications from the conversion module that sampling processes have been performed.

* * * * *